United States Patent
Cottrell et al.

[15] 3,664,453
[45] May 23, 1972

[54] DEADMAN SEAT ACTUATED BRAKE AND HANDBRAKE CONSTRUCTION

[72] Inventors: Samuel H. Cottrell, Mound; Sam R. Montgomery, Minnetonka, both of Minn.

[73] Assignee: White Farm Equipment Company

[22] Filed: June 8, 1970

[21] Appl. No.: 44,385

[52] U.S. Cl. .......................... 180/101, 188/106 R, 188/109
[51] Int. Cl. ....................................... B60t 7/00, F16d 65/30
[58] Field of Search ............... 188/109, 106 R, 347; 180/100, 180/101, 102

[56] References Cited

UNITED STATES PATENTS 1,380,887  6/1921  Davis ..................................... 180/101
3,259,203  7/1966  Ryskamp ......................... 188/109 X

FOREIGN PATENTS OR APPLICATIONS 1,115,979  1/1956  France ................................. 180/101

Primary Examiner—George E. A. Halvosa
Attorney—Watts, Hoffmann, Fisher & Heinke

[57] ABSTRACT

A brake-actuated lever is movable to apply brakes by a hand-operated cable. A spring applies the brakes through a second lever having a pin-engaging first lever. Lost motion between cable and first lever permits movement of first lever by second lever without movement of cable. Second lever moved from first lever by toggle joint shifted towards dead center by weight of operator on seat.

14 Claims, 2 Drawing Figures 3,664,453

DEADMAN SEAT ACTUATED BRAKE AND HANDBRAKE CONSTRUCTION

CROSS REFERENCE TO RELATED APPLICATION

An application entitled "Deadman Seat Actuated Brake" filed concurrently by S. H. Cottrell Ser. No. 43,854.

BACKGROUND OF THE INVENTION

1. Field of the Invention.

The present invention is directed to vehicle brake actuating mechanisms equipped with hand "parking" brakes. More particularly, the invention relates to vehicles which also have so-called "deadman" brake actuating mechanisms which automatically apply the brakes whenever the operator's seat is unoccupied.

2. Prior Art.

In the past, vehicles such as fork-lift trucks and golf carts have been equipped with devices known as deadman brakes. In such vehicles, the typical deadman brake is actuated by the operator's seat. Usually the seat is spring biased upwardly so that when the operator leaves the truck, the seat elevates. Elevation of the seat actuates a mechanism which causes brakes to be applied.

Prior deadman brake proposals have included mechanical linkages which apply the brakes when the seat is elevated and release them when the seat is depressed. Among other deficiencies, these linkages have been susceptible to intermittent, unintended brake applications when the vehicle is traversing rough terrain. For example, if a fork-lift truck equipped with one of the prior art deadman linkages passed over a bump at a relatively great rate of speed, the bouncing of the driver could cause unintended and undesired brake application. Prior mechanical linkages have failed to accommodate the bouncing in that they are typically designed such that the maximum rate of brake application occurs as the seat commenced to rise. Since the maximum rate of brake application occurs as the seat commences to rise, the amount of bouncing which can be accommodated without unintended brake application is minimized.

In many prior deadman brake arrangements, there has been no provision at all for the application of parking or emergency brakes unless the operator leaves the seat so that the brakes are automatically applied. In others, a separate handbrake has been provided so that the handbrake and the deadman brake become parallel systems for emergency or parking brake application. There are times when it is desirable to apply an emergency or parking brake when the operator seat is occupied. While this is desirable, obviously the provision of a parallel brake system to accomplish this objective is expensive, space-consuming and complicated.

THE PRESENT INVENTION

The present invention provides a truck in which parking or emergency brakes are applied through either a hand-operated lever or automatic application when the operator seat is not occupied. In the referenced copending and concurrently-filed application, there is a disclosure of an improved deadman brake which is not susceptible to unintended brake application due to bouncing of the operator seat. The improved deadman brake of that application includes the feature that as the seat is moved to apply the brakes, the rate at which the brakes are applied increases. Unintended brake application is avoided through the provision of the toggle joint which is substantially at straight line or dead center position when the brakes are released. Because of this, the rate of brake application is initially at a low rate and increases as the seat is raised and the toggle joint flexes such that its effective length is shortened.

With the construction of this invention, a handbrake is supplied in combination with the novel deadman brake of the referenced application. According to this invention, the parking brake is applied through a single brake-applying linkage either when the handbrake is applied or when the operator seat is unoccupied.

With this invention, a brake-applying hand lever has a lost motion connection with a brake application linkage. This lost motion connection permits seat actuation of a deadman brake linkage whether the hand lever is in a brake applied or a brake release position.

Similarly, another lost motion connection permits free movement of the hand lever between its brake applied and brake release positions irrespective of the position of the deadman linkage.

Accordingly, the object of the present invention is the provision of a new and improved mechanism for vehicles of the character mentioned in which a brake-actuating mechanism is operated to apply brakes either by a hand lever or a deadman linkage.

Other objects and advantages of the invention will be apparent from the following description of a preferred form thereof, reference being made to the accompanying drawings.

DESCRIPTION OF THE PREFERRED EMBODIMENT

Figure 1:
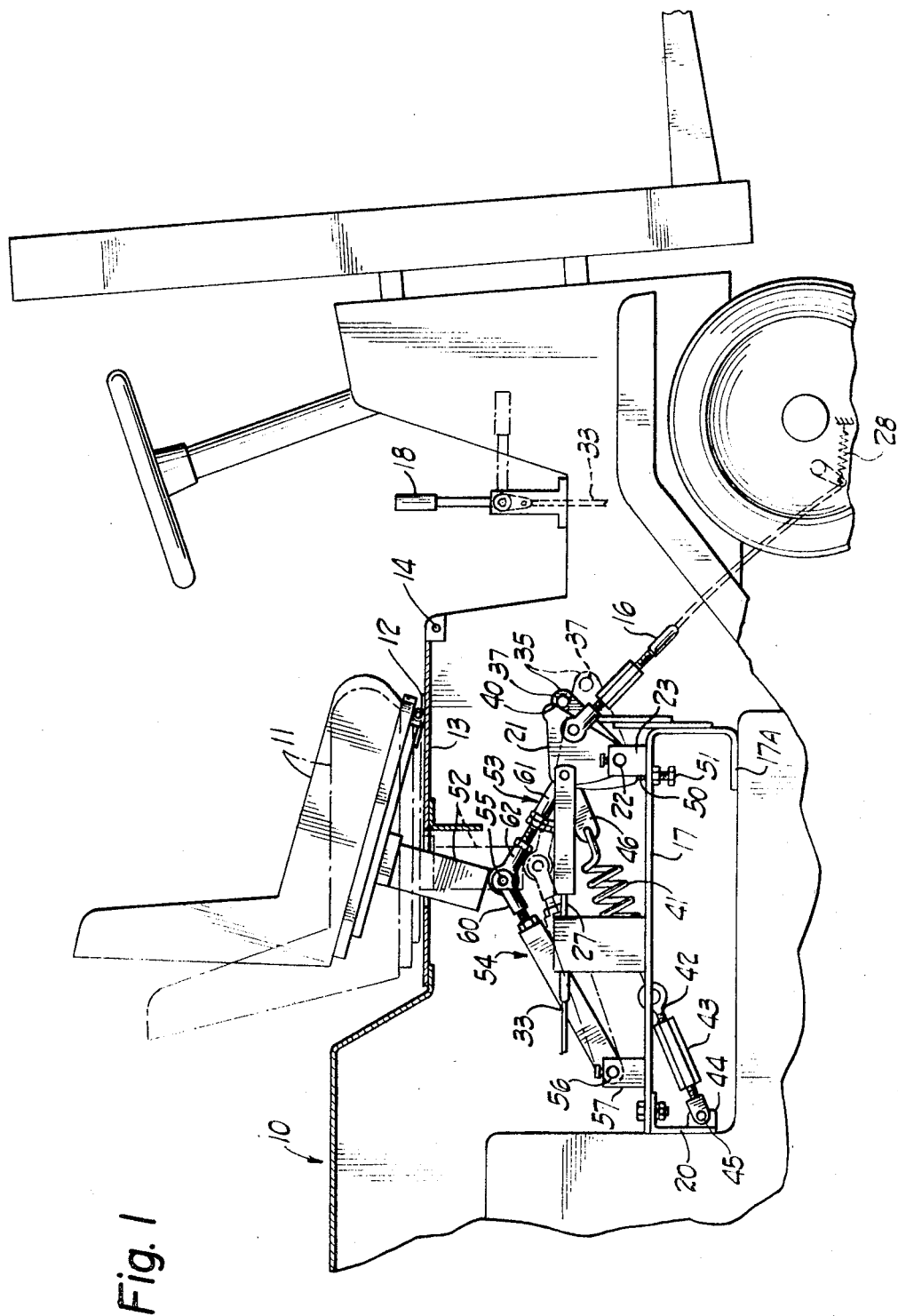
FIG. 1 is a fragmentary side view of a fork-lift truck embodying the invention; and, FIG. 2 is a plan view of the brake control mechanism shown in FIG. 1 and on a larger scale.

Referring to the drawings, a fork-lift truck is shown generally at 10. Apart from the brake-applying mechanism, the truck 10 is of conventional construction. The truck 10 includes an operator's seat 11 which is pivotally supported at 12 on a hood 13. The hood 13 closes an access opening to the interior of the truck and is adapted to swing about a pivot 14.

The brakes of the truck 10 are actuated by a linkage including a link 16. When the brakes are applied the link 16 is shifted to the left as seen in FIG. 1 to the position shown to apply the brakes. The brakes are applied by a manual control member 18, or by a spring-actuated mechanism in response to the operator leaving his seat.

The brake control mechanism has a base plate 17. The base plate 17 is suitably fixed to the truck beneath the seat 11. to facilitate installation on the truck, the plate 17 has a channel shaped formation 17a at its forward end which is bolted to a horizontal wall of the truck. The rear of the base plate 17 is bolted to a bracket 20 attached to an upright wall of the truck.

A cam lever 21 is provided. The cam lever 21 is rotatably supported on a shaft 22. The shaft 22 is mounted in two upright blocks 23, 24 on the base plate 17.

The brake actuating member 16 is attached to the lever 21 and applies the vehicle brakes when the lever is moved to the position shown in full lines in FIG. 1. When the lever 21 is in the dotted line position, the brakes are released. The link 16 is attached to the lever 21 by a clevis 25 which straddles the lever and a pin 26.

The lever 21 may be moved counterclockwise from the brake release to the brake applied position as seen in full lines in FIG. 1, either by the manual brake operating handle 18 or by removal of the operator from the seat 11. The brake operating handle is conveniently mounted on the body of the truck for actuation by the operator and is connected with lever 21 by a Boden cable 27. One end of the cable 27 extends through an opening in the yoke of a clevis 30 which is pivotally attached to the lever 21 by a pin 31. The cable 27 proper has free movement through the opening in the clevis and is limited in movement by a ball formation 32 secured to the end of the cable and which is larger than the opening through which the cable passes. This arrangement is a lost motion connection which permits counterclockwise movement of the lever 21 independently of movement of the cable 27.

The cable 27 is enclosed in a flexible sheath 33, one end of which is secured to a bracket 34 attached to the base plate 17. When the operator applies the handbrake, the cable 27 is moved to the left and swings the lever 21 counterclockwise about its pivot and moves the link 16 to set the brakes. A brake-release spring 28 returns the link 16 and lever 21 to the brake-release position when the lever is freed for clockwise rotation.

The lever 21 is also rotated counterclockwise to set the brakes in response to the operator leaving the seat of the vehicle and independently of movement of the cable 27. This is accomplished by providing an actuating lever or plate 35 rotatably supported on the shaft 22 and spaced from lever 21 by a spacer 36. The spacer 36 is supported on the shaft and interposed between the levers 21, 35. Counterclockwise rotation of the actuator plate 35 may be transmitted to the lever 21 by a pin 37 projecting from a side of the plate and engaging edge surface 40 of the lever.

The lever 35 is urged in a counterclockwise direction about the pin 22 by a tension spring 41. One end of the spring 41 is anchored to an eye bolt 47. The eye bolt is threaded in a turnbuckle 43. The turnbuckle is attached to a flange 44 of the bracket 20 by a pin 45.

The opposite end of the spring 41 is attached to a link 46. The link 46 is pivotally supported on a crank pin 47 that projects from the rear face of the plate 35, FIG. 1. Movement of the plate 35 by the spring 41 is limited by the plate engaging a stop 50. The stop 50 is formed by a screw which is threaded into an opening in the base plate 17. The screw is fixed in an adjusted position by a lock nut 51.

The plate 35 is moved from the stop screw 50 and against the tension of the spring 41 to release the brakes when the seat 11 of the truck is depressed. This movement of the plate 35 is effected by an abutment 52 on the seat engaging the knee of a broken toggle joint and depressing the joint to near its dead center. The toggle joint comprises two arms 53, 54 which are pivotally connected at adjacent ends by a pin 55. The arm 54 is preferably formed of a bar, and is pivotally anchored at its left-hand end to the base plate 17 by a pin 56 supported by a pair of upstanding lugs 57 attached to the base plate. The end of arm 53 is pivotally attached to the crank pin 47 on the plate and moves the plate clockwise to the brake release position as the toggle joint moves from the broken position shown in full lines in FIG. 1, toward, but not quite to, its dead center position, as illustrated by the broken lines.

The force of the spring 41 continually urges the plate 35 counterclockwise to the brake applying position shown in full lines in FIG. 1 and overpowers the force of the brake release spring 28.

The movement of the knee of the toggle joint is controlled by the abutment 52 projecting downwardly from the seat 11. When the operator occupies the seat, the abutment 11 depresses the toggle joint which moves the plate 35 to the brake release position. While the operator's seat is occupied, the brake may be applied by manual operation of the cable 27 to draw the ball 32 against the yoke of the clevis 30 and move the lever 21 to the brake setting position. Since the connection of the plate 35 to the lever 21 is only through the pin 37, the connection serves as a lost motion connection which permits free operation of the lever 18 in any position of the deadman toggle linkage.

Figure 2:
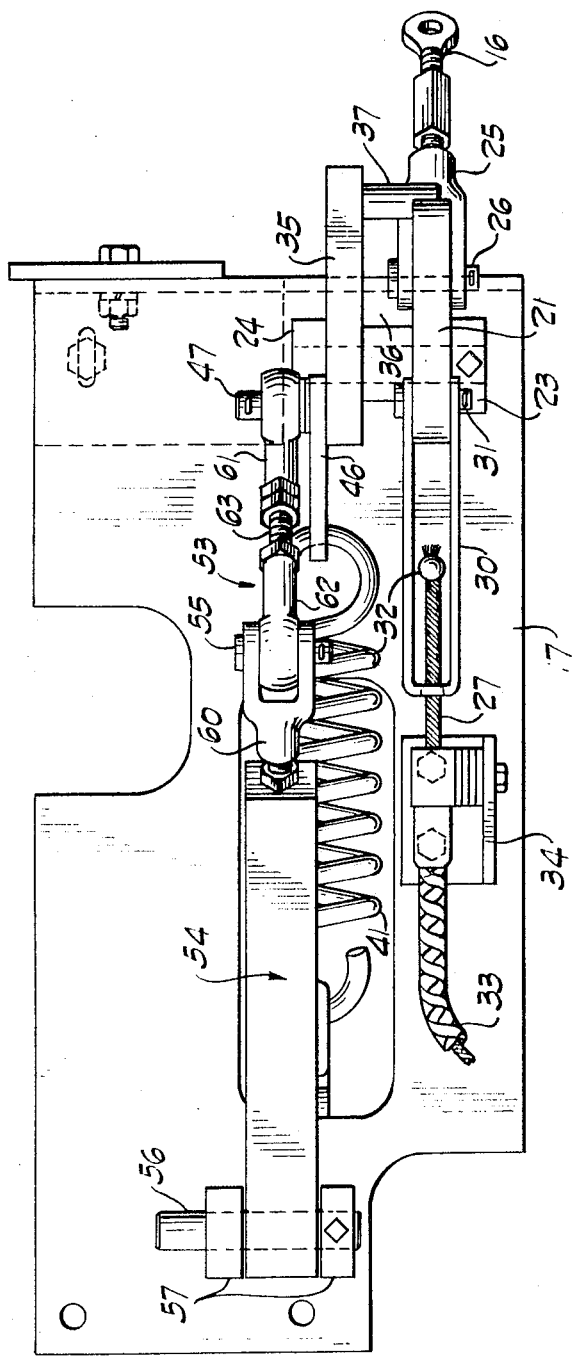

Should the operator leave the seat, the force of spring 41 will move the plate 35 counterclockwise and move the lever 21 and apply the brakes. Also, the vacated seat is raised by upward buckling of the toggle arms 53, 54. Because the cable 27 is connected to the clevis 30 by the ball 32, the lever 21 may move independently of the cable as seen in FIG. 2.

The action of toggle arms 53, 54 can be adjusted by changing the effective lengths of each arm. For this purpose the arm 54 includes a clevis 60 which supports the ends of the pin 55. The clevis 60 has a part which is threaded into a bore of the arm proper. The arm 53 is formed of two stem and eye members 61, 62, the eyes of which receive the pins 47 and 55 respectively. The stems of the members 61, 62 are threaded on a shank 63 to provide adjustability in length of the combined members.

Although the invention has been described in its preferred form with a certain degree of particularity, it is understood that the present disclosure of the preferred form has been made by way of example and that numerous changes and arrangement of parts may be resorted to without departing from the spirit and the scope of the invention as hereinafter claimed.

What is claimed is:

1. A vehicle having a brake system and an operator's seat adapted to move in a vertical plane by changes in load on the seat, operating means for said brake system including a brake actuating member shiftable in opposite directions between a brake application position and a brake release position, a frame supported on the vehicle, a first lever pivoted on said frame for movement in a given plane, and connected to said brake actuating member for moving said actuating member between said positions, brake control means operable by the operator of said vehicle and including a cable adapted to move longitudinally, lost motion means connecting said cable to said first lever whereby said cable positively moves said first lever from said brake release position to said brake application position and said first lever may move from said brake release position to said brake applying position independently of movement of said cable, a second lever pivoted on said frame and adapted to move about its pivot in a plane parallel to said plane of movement of said first lever, abutment means on said first and second levers operable to cause said second lever to move said first lever from said brake release position to said brake applying position and to permit movement of said first lever from said brake release position to said brake applying position independently of movement of said second lever, spring means urging said second lever in a direction to move said second lever and said first lever to said brake applying position, and means responsive to downward movement of said operator's seat to move said second lever to a position to permit movement of said first lever to said brake release position.

2. A vehicle having a brake system and operating means as defined in claim 1 further characterized by said lost motion means comprising a U-shaped connector member comprising a pair of legs connected by a yoke and having the ends of the legs pivoted to said first lever, an opening through the yoke through which said cable slidingly extends, and an enlargement on the end of the portion of the cable extended through said opening.

3. A vehicle having a brake system and operating means therefor as defined in claim 1 further characterized by said first and second levers being pivotally supported on a common bearing shaft, and said second lever having a laterally extending abutment projecting into said plane of movement of said first lever.

4. A vehicle having a brake system and operating means therefor as defined in claim 1 further characterized by the last named means comprising a toggle joint including two arms having two adjacent ends pivotally connected, the other end of one of said arms being anchored to said frame and the other end of the other of said arms attached to said second lever.

5. In a vehicle having a frame structure supported on ground engaging wheels, a brake system, a seat movably mounted on the frame structure for movement between an occupied position and an unoccupied position, and a operator controlled handle for applying the brakes, the improvement of a brake application arrangement interconnecting the seat, the handle and the brakes comprising:
   a. a brake application linkage coupled to the brakes and movable between a brake applied position and a brake released position;
   b. a first brake application means interposed between the seat and said linkage for effecting movement of said linkage to the brake applied position in response to movement of the seat to the unoccupied position;
   c. a second brake application means interposed between the handle and said linkage for effecting movement of said linkage to the brake applied position;
   d. said brake application means being so constructed as to permit brake application movement of either brake application means at all times without causing a corresponding brake application movement of the other brake application means, whereby the brakes can be applied by the handle without causing corresponding movement of the seat and regardless of the position of the seat, and the brakes can be applied by moving the seat to the unoccupied position without causing corresponding movement of the handle and regardless of the position of the handle;

e. said first brake application means being constructed such that the rate of brake application increases as the seat is moved toward its unoccupied position, whereby the initial movement of the seat will result in minimal movement of said linkage toward the brake applied position whereas subsequent increments of movement will result in progressively greater movements of said linkage toward the brake application position, thereby maximizing the amount of seat movement that can be accommodated without intermittent brake application as the vehicle traverses rough terrain.

6. The vehicle of claim 5 wherein said first brake actuation means includes a biasing means and is constructed so as to transmit minimal force from said biasing means to the seat when the seat is in its occupied position, and to transmit progressively greater force from said biasing means to the seat as the seat moves toward its unoccupied position, whereby the upward force tending to raise the occupied seat is minimized so as to minimize bouncing of the operator as the vehicle traverses rough terrain, thereby minimizing intermittent brake application due to bouncing of the seat.

7. The vehicle of claim 6 wherein said first brake actuation means comprises a pair of arms pivotally connected together and movable from a position of one relative angle when in the brake release position to a more acute relative angle when in the brake applied position.

8. The vehicle of claim 7 wherein said first brake actuation means further includes a projection depending from the seat and resting on said pair of arms at the position of their interconnection, one of said arms being pivotally coupled to the vehicle frame at a first location spaced from said position of interconnection, the other of said arms being coupled to said linkage means at a second location spaced from said position.

9. The vehicle of claim 8 wherein said pair of arms are substantially in alignment when in the brake-released position.

10 In a vehicle having a frame structure supported on ground engaging wheels, a brake system, a seat movably mounted on the frame structure for movement between an occupied position and an unoccupied position, and a operator controlled handle for applying the brakes, the improvement of a brake application arrangement interconnecting the seat, the handle and the brakes comprising:

a. a brake application linkage coupled to the brakes and movable between a brake applied position and a brake released position;
b. a first brake application means interposed between the seat and said linkage for effecting movement of said linkage to the brake applied position in response to movement of the seat to the unoccupied position;
c. a second brake application means interposed between the handle and said linkage for effecting movement of said linkage to the brake applied position;
d. said linkage means including a first pivotally mounted lever movable between brake released and brake applied positions;
e. said first brake application means including a second pivotally mounted lever movable in response to movement of the seat between occupied and unoccupied positions;
f. said first brake application means further including a first lost motion connection interposed between said levers; and,
g. said second brake application means further including a second lost motion connection interposed between the handle and said first lever.

11. The vehicle of claim 10 wherein said first lost motion connection comprises abutment means on said first and second levers operable to cause said second lever to move said first lever from the brake released position to the brake applied position in response to movement of the seat to the unoccupied position, while permitting movement of said first lever to the brake applied position at all times regardless of the position of the seat.

12. The vehicle of claim 11 wherein said first brake application means additionally includes spring means urging said second lever in a direction to move said second lever and said first lever to the brake applied position.

13. The vehicle of claim 12 wherein said first brake application means additionally includes connection means responsive to the movement of the seat toward the occupied position to move said second lever to a position which will permit movement of said first lever to the brake release position.

14. The vehicle of claim 13 wherein connection means comprises a toggle joint including two arms having two adjacent ends pivotally connected, the opposite end of one arm being anchored to the frame and the opposite end of the other arm being connected to said second lever.

* * * * *